US009563048B2

(12) United States Patent
Fukutake et al.

(10) Patent No.: US 9,563,048 B2
(45) Date of Patent: Feb. 7, 2017

(54) MICROSCOPE SYSTEM, SERVER, AND PROGRAM PROVIDING INTENSITY DISTRIBUTION OF ILLUMINATION LIGHT SUITABLE FOR OBSERVATION

(75) Inventors: Naoki Fukutake, Tokyo (JP); Shinichi Nakajima, Tokyo (JP); Hirohisa Taira, Ibaraki (JP)

(73) Assignee: Nikon Corporation, Tokyo (JP)

( * ) Notice: Subject to any disclaimer, the term of this patent is extended or adjusted under 35 U.S.C. 154(b) by 470 days.

(21) Appl. No.: 13/362,642

(22) Filed: Jan. 31, 2012

(65) Prior Publication Data

US 2012/0262561 A1 Oct. 18, 2012

Related U.S. Application Data

(60) Provisional application No. 61/534,170, filed on Sep. 13, 2011.

(30) Foreign Application Priority Data

Apr. 12, 2011 (JP) ................................ P2011-087822

(51) Int. Cl.
*H04N 7/18* (2006.01)
*G02B 21/14* (2006.01)
(Continued)

(52) U.S. Cl.
CPC .............. *G02B 21/14* (2013.01); *G02B 21/12* (2013.01); *G02B 21/365* (2013.01); *G06K 9/2027* (2013.01)

(58) Field of Classification Search
CPC .................................................... G02B 21/14
(Continued)

(56) References Cited

U.S. PATENT DOCUMENTS 4,067,938 A * 1/1978 Jack ................................ 264/41
4,561,731 A 12/1985 Kley
(Continued)

FOREIGN PATENT DOCUMENTS

JP 06-003599 A 1/1994
JP 08-220568 A 8/1996
(Continued)

OTHER PUBLICATIONS

International Search Report for International Patent Application No. PCT/JP2012/052569, mailed May 30, 2012.
(Continued)

*Primary Examiner* — Leron Beck
(74) *Attorney, Agent, or Firm* — Shapiro, Gabor and Rosenberger, PLLC

(57) ABSTRACT

A microscope includes an illuminating optical system that illuminates the test object under predetermined illumination conditions, an imaging optical system that forms an image of the test object, and an image sensor that outputs an image signal. A computer includes an image analyzing unit that acquires an image feature amount of the test object on the basis of the image signal detected by the image sensor, a comparison unit that compares the image feature amount of the test object with image feature amounts of a plurality of sample test objects and specifies an image feature amount of a sample test object closest to the image feature amount of the test object, and a setting unit that sets illumination conditions of the illuminating optical system on the basis of an illumination state suitable for observation of a sample test object having the image feature amount specified by the comparison unit.

12 Claims, 11 Drawing Sheets

(51) Int. Cl.
*G02B 21/12* (2006.01)
*G02B 21/36* (2006.01)
*G06K 9/20* (2006.01)

(58) Field of Classification Search
USPC .......................................................... 348/79
See application file for complete search history.

(56) References Cited

U.S. PATENT DOCUMENTS

| | | | |
|---|---|---|---|
| 4,873,653 | A | 10/1989 | Grosskopf |
| 6,243,197 | B1 | 6/2001 | Schalz |
| 6,839,166 | B2 | 1/2005 | Fukushima et al. |
| 6,924,893 | B2 | 8/2005 | Oldenbourg et al. |
| 7,564,622 | B2 | 7/2009 | Ishiwata |
| 9,250,432 | B2 | 2/2016 | Weiss et al. |
| 2003/0015643 | A1 | 1/2003 | Veith et al. |
| 2003/0030902 | A1 | 2/2003 | Fukushima et al. |
| 2003/0183775 | A1* | 10/2003 | Mutou .................. 250/440.11 |
| 2004/0047033 | A1 | 3/2004 | Nakagawa |
| 2004/0061914 | A1 | 4/2004 | Miyawaki et al. |
| 2005/0190437 | A1 | 9/2005 | Nakagawa |
| 2007/0211243 | A1 | 9/2007 | Laroche et al. |
| 2008/0259345 | A1 | 10/2008 | Fukutake |
| 2011/0013136 | A1 | 1/2011 | Archambeau et al. |
| 2011/0109961 | A1 | 5/2011 | Hayashi et al. |
| 2012/0086795 | A1 | 4/2012 | Weiss et al. |
| 2012/0099172 | A1 | 4/2012 | Ohki |

FOREIGN PATENT DOCUMENTS

| | | |
|---|---|---|
| JP | 08-327324 A | 12/1996 |
| JP | 2000-502472 A | 2/2000 |
| JP | 2003-121749 A | 4/2003 |
| JP | 2004-101871 A | 4/2004 |
| JP | 2005-292538 A | 10/2005 |
| JP | 2009-237109 A | 10/2009 |
| JP | 2010-507119 T | 3/2010 |
| JP | 2012-083755 A | 4/2012 |
| JP | 2012-088530 A | 5/2012 |
| WO | WO 2008/046858 A1 | 4/2008 |
| WO | WO 2008/123408 A1 | 10/2008 |

OTHER PUBLICATIONS

Written Opinion of the International Searching Authority for International Patent Application No. PCT/JP2012/052569, mailed May 30, 2012.
Office Action issued Jan. 23, 2015, in Chinese Patent Application No. 201280017713.8.
Final Office Action dated Oct. 6, 2014, in U.S. Appl. No. 13/276,698.
Non-Final Office Action dated Jun. 20, 2014, in U.S. Appl. No. 13/276,698.
Final Office Action dated Jul. 9, 2013, in U.S. Appl. No. 13/276,698.
Non-Final Office Action dated Feb. 1, 2013, in U.S. Appl. No. 13/276,698.
Invitation to Pay Additional Fees with Partial International Search Report issued Dec. 29, 2011, in International Patent Application No. PCT/JP2011/074597.
International Search Report for International Patent Application No. PCT/JP2011/074597, mailed Apr. 16, 2012.
Written Opinion of the International Searching Authority for International Patent Application No. PCT/JP2011/074597, mailed Apr. 16, 2012.
Office Action issued Sep. 22, 2014, in Japanese Patent Application No. 2010-235155.
Office Action issued Nov. 3, 2014, in Chinese Patent Application No. 201180050056.2.
Non-Final Office Action dated Jun. 19, 2015, in U.S. Appl. No. 13/276,698.
Office Action issued Jul. 23, 2015, in Taiwanese Patent Application No. 100137820.
Office Action issued Aug. 27, 2015, in Chinese Patent Application No. 201280017713.8.
Office Action issued Dec. 21, 2015, in Taiwanese Patent Application No. 101106455.
Office Action issued Apr. 4, 2016, in Japanese Patent Application No. 2015-070899.
Office Action issued Apr. 22, 2016, in Taiwanese Patent Application No. 100137820.
Notice of Allowance dated Apr. 11, 2016, in U.S. Appl. No. 13/276,698.
Notice of Allowance dated Jan. 6, 2016, in U.S. Appl. No. 13/276,698.

* cited by examiner

FIG. 3

| | PREDETERMINED INTENSITY DISTRIBUTION OF ILLUMINATION LIGHT | FOURIER COMPONENT |
|---|---|---|
| (a) 60 | 91 (circle) | FC — intensity vs frequency |

| (b) SAMPLE TEST OBJECT NO. | PREDETERMINED INTENSITY DISTRIBUTION OF ILLUMINATION LIGHT | FOURIER COMPONENT | SUITABLE INTENSITY DISTRIBUTION OF ILLUMINATION LIGHT | SUITABLE WAVELENGTH FILTER |
|---|---|---|---|---|
| SM01 | 91 | FC01 | 91, R1 (annular) | A |
| SM02 | 91 | FC02 | two spots | B |
| SM03 | 91 | FC03 | 91, R2 (annular) | A |
| SM08 | 91 | FC08 | annular | C |
| SM09 | 91 | FC09 | 91 (full) | A |
| SM10 | 91 | FC10 | crescent | A |

FIG. 7

MICROSCOPE SYSTEM, SERVER, AND PROGRAM PROVIDING INTENSITY DISTRIBUTION OF ILLUMINATION LIGHT SUITABLE FOR OBSERVATION

CROSS-REFERENCE TO RELATED APPLICATION

This application is a non-provisional application claiming priority to the benefit of U.S. provisional application No. 61/534,170, filed Sep. 13, 2011, and the Japanese Patent Application No. 2011-087822, filed Apr. 12, 2011. The entire contents of which are incorporated herein by reference.

BACKGROUND

Field of the Invention

The present invention relates to a microscope system, a server, and a program which can derive and form an intensity distribution of illumination light suitable for observation.

Description of Related Art

In bright-field microscopes, an intensity distribution of illumination light is adjusted by varying a circular aperture. In addition, there are cases where the shape of the aperture is selected and used through determination of an observer. In phase-contrast microscopes, a ring (orbicular) aperture and a phase ring form the intensity distribution of illumination light.

Since the intensity distribution of illumination light has a great influence on an observed image of a test object, studies into the improvement in quality of the observed image of a test object have been made in addition to improvement of the circular aperture, the ring aperture, the phase ring, and the like. For example, Japanese Unexamined Patent Application Publication No. 2009-237109 shows a phase-contrast microscope in which a modulation unit is provided so as to surround a ring region where a phase ring is provided in a ring shape, and the modulation unit and regions other than the modulation unit are formed so as to have different transmission axes, and thereby contrast can be continuously variable.

SUMMARY

However, in the above-mentioned bright-field microscopes or the phase-contrast microscopes, the shape of the aperture is determined to a certain extent and the adjustment of the intensity distribution of illumination light is limited thereto. When the shape of the aperture is selected, the selection is made on the basis of an observer's determination or experience. Accordingly, it cannot be said that the aperture necessarily has a shape sufficient to observe an object image under observation in the best state. On the other hand, when it is allowed to arbitrarily select the shape of the aperture, it is difficult for an observer to select the shape of the aperture most suitable for a test object.

Aspects of the invention provide a microscope system, a server, and a program that can acquire an intensity distribution of illumination light suitable for a test object so as to observe the test object.

According to a first aspect of the invention, there is provided a microscope system including an optical microscope for observing a test object and a computer connected to the microscope. The microscope includes an illuminating optical system that illuminates the test object with illumination light from a light source under predetermined illumination conditions, an imaging optical system that forms an image of the test object on the basis of light from the test object, and an image sensor that detects the image of the test object formed by the imaging optical system and outputs an image signal. The computer includes an image analyzing unit that acquires an image feature amount of the test object on the basis of the image signal detected by the image sensor, a comparison unit that compares the image feature amount of the test object with image feature amounts of a plurality of sample test objects and specifies an image feature amount of a sample test object closest to the image feature amount of the test object, and a setting unit that sets illumination conditions of the illuminating optical system on the basis of an illumination state suitable for observation of a sample test object having the image feature amount specified by the comparison unit.

According to a second aspect of the invention, there is provided a server including: a second receiver unit that receives the image feature amount of the test object from the microscope system according to the first aspect; a second comparison unit that compares the image feature amount of the test object received by the second receiver unit with the image feature amounts of a plurality of sample test objects and specifies an image feature amount of the sample test object which is closest to the image feature amount of the test object; a second setting unit that sets the illumination conditions of the illuminating optical system on the basis of an illumination state suitable for observation of the sample test object having the image feature amount specified by the second comparison unit; and a second transmitter unit that transmits the illumination conditions of the illuminating optical system set by the second setting unit to the microscope system.

According to a third aspect of the invention, there is provided a program used in a microscope system including a microscope including an illuminating optical system that illuminates the test object with illumination light from a light source under predetermined illumination conditions, an imaging optical system that forms an image of the test object on the basis of light from the test object, and an image sensor that detects the image of the test object formed by the imaging optical system and outputs an image signal and a computer connected to the microscope. The program causes the computer to perform: image analysis of acquiring an image feature amount of the test object on the basis of the image signal detected by the image sensor; comparison of comparing the image feature amount of the test object with image feature amounts of a plurality of sample test objects; specification of specifying the image feature amount of the sample test object closest to the image feature amount of the test object; and setting of setting illumination conditions of the illuminating optical system on the basis of an illumination state suitable for observation of the sample test object having the image feature amount specified by the comparison unit.

According to aspects of the invention, it is possible to provide a microscope system, a server, and a program which can set illumination conditions suitable for observing an object image under observation in an excellent state.

BRIEF DESCRIPTION OF THE DRAWINGS

FIG. 3 is a conceptual diagram illustrating a spatial frequency component and the like stored in a storage unit in the first embodiment.

FIG. 7 is a conceptual diagram illustrating a spatial frequency component and the like stored in a storage unit in the second embodiment.

DESCRIPTION OF EMBODIMENTS

First Embodiment

A microscope system 100 including a bright-field microscope which can freely change the shape of an aperture will be described below as a first embodiment of the invention. In the microscope system 100, an intensity distribution of illumination light suitable for observing an object image under observation in an excellent state is derived and automatically adjusted.

<Microscope System 100>

Figure 1:
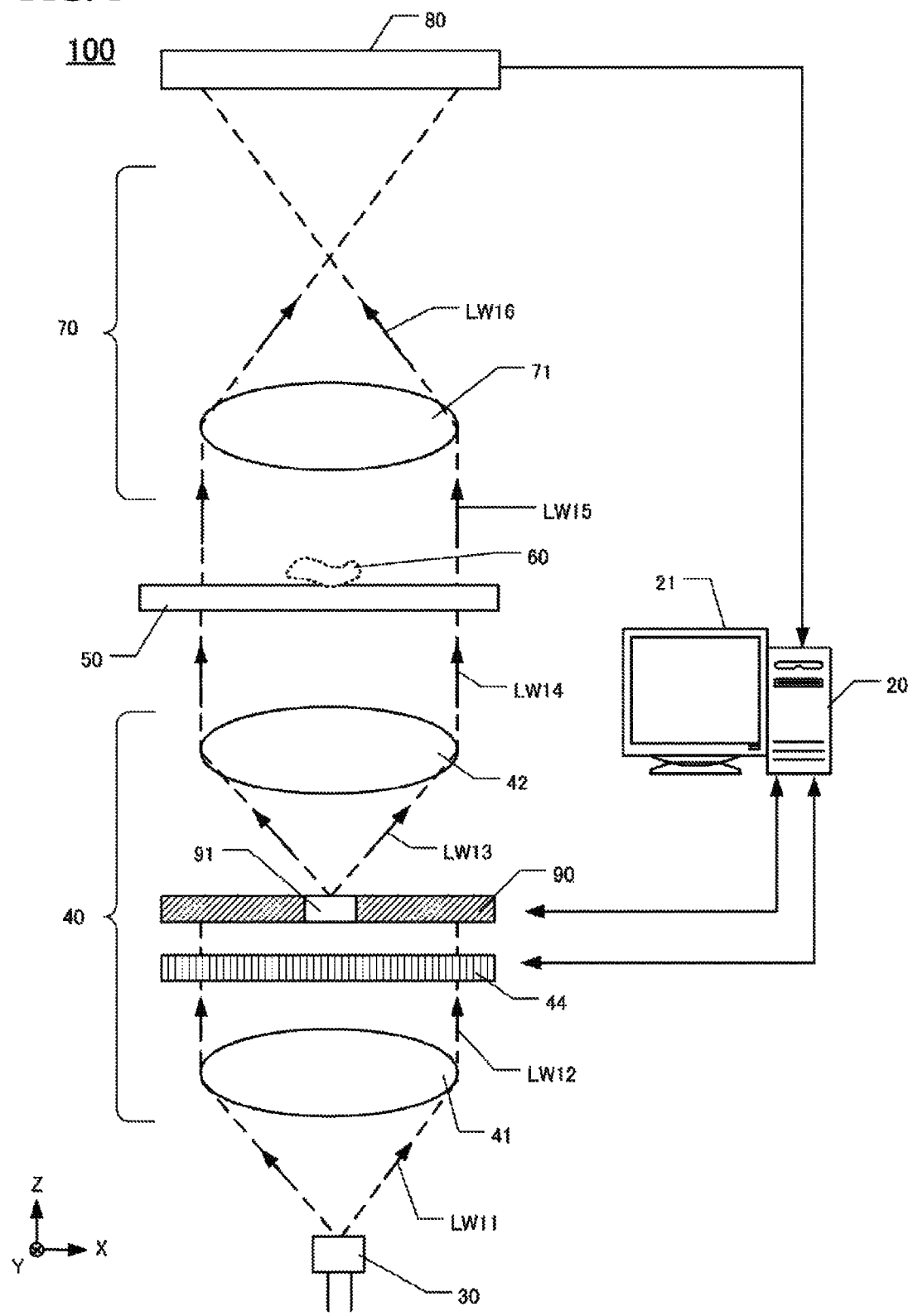
FIG. 1 is a diagram schematically illustrating the configuration of a microscope system in the first embodiment.

FIG. 1 is a diagram schematically illustrating the configuration of the microscope system 100. The microscope system 100 includes an illumination light source 30, an illuminating optical system 40, a stage 50, an imaging optical system 70, and image sensor 80, and a calculation unit 20 as major constituents. In the following description, the central axis of a light beam emitted from the illumination light source 30 is defined to be parallel to the Z axis direction and directions perpendicular to each other and perpendicular to the Z axis are defined as the X axis direction and the Y axis direction.

The illumination light source 30 illuminates, for example, a test object 60 with white illumination light. The illuminating optical system 40 includes a first condenser lens 41, a wavelength filter 44, a first spatial light modulating device 90, and a second condenser lens 42. The imaging optical system 70 includes an objective lens 71. The stage 50 can move in the X and Y axis directions while having the test object 60, which has an unknown structure such as a cell tissue, placed thereon. The imaging optical system 70 focuses transmitted light or reflected light from the test object 60 on the image sensor 80.

The first spatial light modulating device 90 of the illuminating optical system 40 is arranged, for example, at a position conjugate to the position of a pupil of the imaging optical system 70. Specifically, a liquid crystal panel or a digital micromirror device can be used as the first spatial light modulating device 90. The first spatial light modulating device 90 includes an illumination region 91 of which the shape and size can be freely changed, and can change the size or shape of the illumination region 91 to arbitrarily change the intensity distribution of illumination light. That is, the first spatial light modulating device 90 can change the intensity distribution of illumination light at the position conjugate to the pupil of the imaging optical system 70. In general, when the diameter of the transmission region 91 of the first spatial light modulating device 90 is increased, the aperture number of transmitted light increases and thus the resolution thereof can be increased. The wavelength filter 44 limits the wavelength of a light beam to be transmitted to a specific range. For example, a band-pass filter transmitting only light of a wavelength in a specific range is used as the wavelength filter 44. The wavelength filter 44 can be attached and detached and it is possible to control the wavelength of light transmitted by the wavelength filter 44 by preparing band-pass filters transmitting light beams of plural different wavelengths and switching the band-pass filters.

The calculation unit 20 receives an image signal detected by the image sensor 80, processes the image signal, and displays the processed image signal on the display unit 21 such as a monitor. The calculation unit 20 analyzes the image signal. The analysis or the like performed by the calculation unit 20 will be described later with reference to FIG. 2.

In FIG. 1, light emitted from the illumination light source 30 is indicated by a dotted line. The light LW11 emitted from the illumination light source 30 is converted into parallel light LW12 by the first condenser lens 41. The light LW12 is specified in wavelength range by passing through the wavelength filter 44 and is then incident on the first spatial light modulating device 90. The light LW13 passing through the illumination region 91 of the first spatial light modulating device 90 is converted into light LW14 by passing through the second condenser lens 42 and is then directed to the stage 50. The light LW15 passing through the stage 50 is converted into light LW16 by passing through the imaging optical system 70 and forms an image of the test object 60 on the image sensor 80.

<Configuration of Calculation Unit 20>

Figure 2:
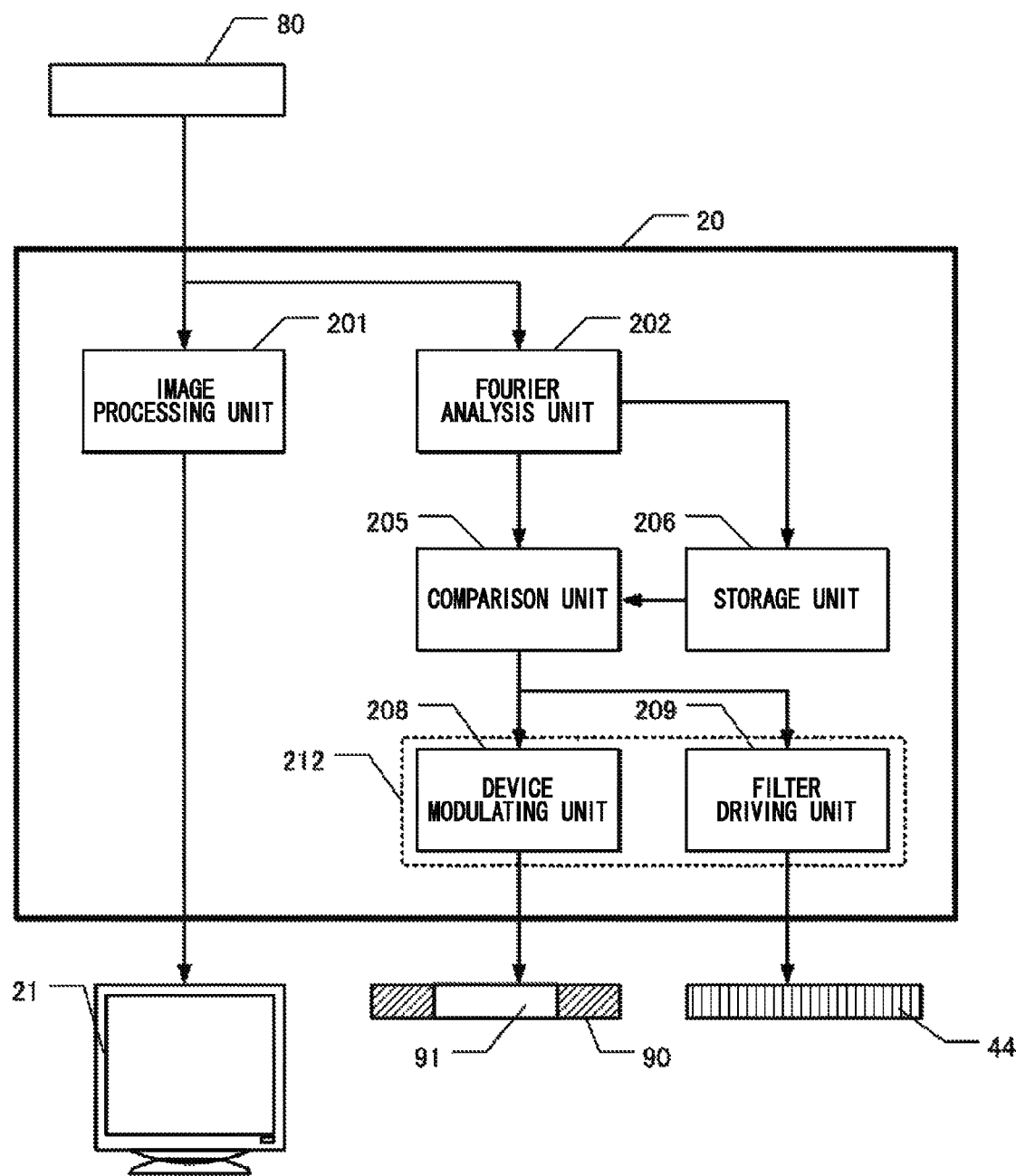
FIG. 2 is a diagram schematically illustrating the configuration of a calculation unit in the first embodiment.

FIG. 2 is a conceptual diagram illustrating the configuration of the calculation unit 20. The calculation unit 20 includes an image processing unit 201, a Fourier analysis unit 202, a comparison unit 205, a storage unit 206, and a setting unit 212.

The image processing unit 201 and the Fourier analysis unit 202 are supplied with the image signal from the image sensor 80. The image processing unit 201 processes the image signal from the image sensor 80 so as to display an image on the display unit 21. The processed signal is sent to the display unit 21 and the image of the test object is displayed on the display unit 21. The Fourier analysis unit 202 Fourier-transforms the image signal from the image sensor 80 and calculates a spatial frequency component. The spatial frequency component of the test object 60 is analyzed. The spatial frequency component is sent to the comparison unit 205 and is also sent to the storage unit 206 to store the spatial frequency component. The Fourier analysis unit 202 may Fourier-transform the entire image signal of the test object 60 from the image sensor 80 or may Fourier-transform a partial image signal of a partial area of the test object 60 selected by an observer. The partial area may be set by the observer or may be automatically set.

The comparison unit 205 compares the spatial frequency component of the test object 60 analyzed by the Fourier analysis unit 202 with spatial frequency components stored in advance in the storage unit 206. The storage unit 206 stores spatial frequency components of plural sample test objects in advance. The spatial frequency components are obtained by Fourier transform based on image signals of the sample test objects. The storage unit 206 stores intensity distributions of illumination light or wavelengths of illumination light suitable for the respective sample test objects. A manufacturer manufacturing the microscope system may prepare the sample test objects as default values. The comparison unit 205 specifies the closest spatial frequency component from the storage unit 206 on the basis of the comparison result in the comparison unit 205. The comparison unit 205 outputs the intensity distribution of illumination light or the wavelength of illumination light suitable for the sample test object having the closest spatial frequency component.

Data of the suitable intensity distribution of illumination light or the suitable wavelength of illumination light is sent to the setting unit 212 setting illumination conditions of illumination light. The setting unit 212 includes a device modulating unit 208 and a filter driving unit 209. The device modulating unit 208 changes the size or shape of the illumination region 91 of the first spatial light modulating device 90 on the basis of the suitable intensity distribution of illumination light. The filter driving unit 209 changes the wavelength range transmitted by the wavelength filter 44 on the basis of the data of the suitable wavelength of illumination light.

<Spatial Frequency Component of Test Object Stored in Storage Unit>

FIG. 3 is a conceptual diagram illustrating the spatial frequency components or the like stored in the storage unit 206. FIG. 3(a) shows an example of the spatial frequency component of the test object 60. FIG. 3(b) shows an example of the spatial frequency components of sample test objects SM01 to SM10.

Presently, the test object 60 is detected by the image sensor 80 with a predetermined intensity distribution of illumination light. For example, the predetermined intensity distribution of illumination light is a distribution in which the illumination region 91 of the first spatial light modulating device 90 is fully opened. The illumination region 91 of the first spatial light modulating device 90 is also stored in correlation with the test object 60 along with the spatial frequency component FC of the test object 60, as shown in FIG. 3(a). Although not shown in the drawings, a filter transmitting light of the overall visible range (400 nm to 800 nm) is used as the wavelength filter 44 when first detecting the test object 60.

The test object 60 and the sample test objects to be described below are detected with the same intensity distribution of illumination light. Accordingly, when both are the same test object, the same spatial frequency component is acquired. In the first embodiment, the predetermined intensity distribution of illumination light is a distribution in which the illumination region 91 is fully opened. The predetermined intensity distribution of illumination light is not limited to this example, but the number of predetermined intensity distributions may be two or more.

The spatial frequency component FC is expressed by the relationship of a frequency, an intensity (amplitude), and a phase. In FIGS. 3(a) and 3(b), the relationship between the frequency and the intensity in a one-dimensional direction is schematically illustrated. However, since the image detected by the image sensor 80 is a two-dimensional image, the image includes the frequency and the intensity in the two-dimensional direction.

The sample test objects SM (SM01 to SM10) have spatial frequency components FC (FC01 to FC10) acquired in advance through the use of experiments or the like. In FIG. 3(b), the sample test objects SM01 to SM10 are stored, which is only an example. It is preferable to have several hundreds of sample test objects stored.

The sample test objects SM01 to SM10 are stored in the storage unit 206 along with the spatial frequency components FC01 to FC10 acquired with the intensity distribution in which the illumination region 91 of the first spatial light modulating device 90 is fully opened. The spatial frequency components FC01 to FC10 may be stored as numerical expressions or may be stored as intensity data for each frequency. Although not shown in the drawings, the spatial frequency components FC01 to FC10 of the sample test objects SM01 and SM10 are detected by using a filter transmitting visible rays.

The sample test objects SM (SM01 to SM10) are stored along with the intensity distributions of illumination light suitable for the respective sample test objects. The optimal wavelength filters are also stored. For example, it is shown that an intensity distribution of illumination light in which a single transmission region 91 has a slight smaller radius R1 is suitable for the sample test object SM01. It is also shown that a wavelength filter 44A (for example, 400 nm to 800 nm) is suitable for the sample test object SM01. It is shown that an intensity distribution of illumination light including two transmission regions 91 is suitable for the sample test object SM02. It is also shown that a wavelength filter 44B (for example, 400 nm to 600 nm) is suitable for the sample test object SM02. It is shown that an intensity distribution of illumination light in which a single transmission region 91 has a smaller radius R2 and a wavelength filter 44A are suitable for the sample test object SM03.

It is shown that an intensity distribution of illumination light including an elliptical transmission region 91 and a wavelength filter 44C (for example, 600 nm to 800 nm are suitable for the sample test object SM08. It is shown that an intensity distribution of illumination light including a fully-opened illumination region 91 and a wavelength filter 44A are suitable for the sample test object SM09. It is shown that an intensity distribution of illumination light including a crescent transmission region 91 and a wavelength filter 44A are suitable for the sample test object SM10.

<Operation of Microscope System 100>

Figure 4:
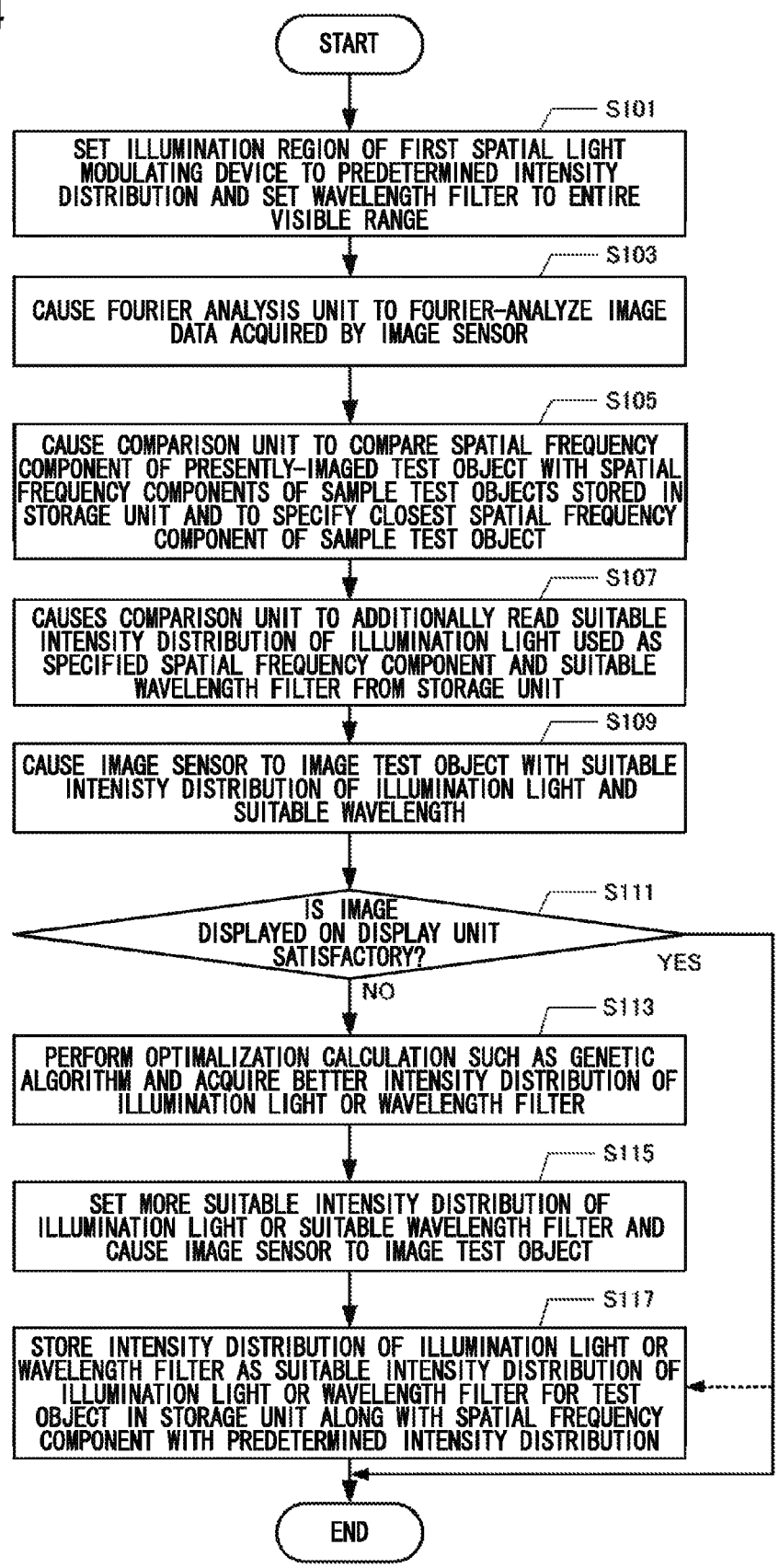
FIG. 4 is an example of a flowchart illustrating the operation flow of the microscope system in the first embodiment.

FIG. 4 is an example of a flowchart illustrating the operation flow of the microscope system 100.

In step S101, first, the illumination region 91 of the first spatial light modulating device 90 is set to a predetermined intensity distribution. As shown in FIG. 3(a), for example, the predetermined intensity distribution of illumination light has an illumination region 91 with the largest radius. A filter transmitting the entire visible range (400 nm to 800 nm) is selected as the wavelength filter 44. Cells or the like as a test object 60 are imaged by the image sensor 80.

In step S103, the Fourier analysis unit 202 analyzes a two-dimensional image detected by the image sensor 80. The detected two-dimensional image is processed by the image processing unit 201 and is then displayed on the display unit 21. An observer may be made to select a partial area of the test object 60 from the two-dimensional image displayed on the display unit 21. The partial area may include one area in the test object 60 or two or more areas. The observer may automatically select the central area of the image sensor 80 as the partial area so as to cause the desired area of the test object 60 to move to the center. When the partial area is selected, the Fourier analysis unit 202 may analyze the image signal of the selected partial area of the test object 60. The partial area may be set by the observer or may be set automatically.

In step S105, the comparison unit 205 compares the spatial frequency component FC of the test object 60 shown in FIG. 3(a) with the spatial frequency components FC01 to FC10 shown in FIG. 3(b). The comparison unit 205 specifies one of the spatial frequency components FC01 to FC10 closest to the spatial frequency component FC through the use of a curve fitting method such as a least-square method. In the example shown in FIG. 3(b), the spatial frequency component FC of the test object 60 is closest to the spatial frequency component FC03 of the sample test object SM03. Accordingly, the comparison unit 205 specifies the spatial frequency component FC03 of the sample test object SM03. When the spatial frequency component FC of the test object 60 is closest to the spatial frequency component FC03 of the sample test object SM03 and the test object 60 is, for example, a cell, it is estimated that the cell structure of the test object 60 resembles the cell structure of the sample test object SM03. Accordingly, the predetermined intensity distribution of illumination light and the wavelength filter suitable for observation of the sample test object SM03 stored in advance in the storage unit 206 can be specified. That is, it is estimated that the intensity distribution of illumination light which has a smaller radius R2 in the transmission region 91, and the wavelength filter 44A, are suitable for the test object 60.

In step S107, the comparison unit 205 further reads the intensity distribution of illumination light and the wavelength filter suitable for observation of the specified sample test object SM03 from the storage unit 206.

In step S109, the suitable intensity distribution of illumination light and the suitable wavelength filter are sent to the device modulating unit 208 and the filter driving unit 209. The illumination region 91 of the first spatial light modulating device 90 is set to the suitable intensity distribution of illumination light. The suitable wavelength filter 44 is also set. The test object 60 is imaged by the image sensor 80. The captured two-dimensional image is displayed on the display unit 21. When an observer intends to observe the test object 60 but does not know what intensity distribution of illumination light or what wavelength filter is suitable, the microscope system 100 can automatically select the suitable intensity distribution of illumination light and the suitable wavelength filter. The microscope system 100 can find the intensity distribution of illumination light or the wavelength filter suitable for the test object 60 in a short time.

In step S111, the observer determines whether the two-dimensional image displayed on the display unit 21 is a satisfactory image. The image of the test object 60 is captured by the use of the suitable intensity distribution of illumination light and the suitable wavelength filter, but the observer may want to observe the test object 60 in a superior state. Furthermore, even when the spatial frequency component FC of the test object 60 is closest to the spatial frequency component FC of the sample test object SM, both are not always equal to each other and thus the two-dimensional image may not be the most suitable one. When the observer determines that the two-dimensional image displayed on the display unit 21 is a satisfactory image (YES), the observation of the test object 60 is ended. As indicated by a dotted line, the observation may be ended after the spatial frequency component when the test object 60 is imaged with a predetermined intensity distribution is stored in step S117. When the observer wants to observe a better two-dimensional image (NO), the operation flow goes to step S113.

In step S113, the intensity distribution of illumination light or the wavelength filter is optimally calculated through the use of a simulated annealing method, a Tabu search method, a hill-climbing method, a genetic algorithm, or the like. A better intensity distribution of illumination light or a better wavelength filter is acquired.

In step S115, the test object 60 is imaged by the image sensor 80 through the use of the intensity distribution of illumination light or the wavelength filter acquired in step S113.

In step S117, the acquired intensity distribution of illumination light or wavelength filter is stored in the storage unit 206 as the intensity distribution of illumination light or the wavelength filter suitable for imaging the test object 60 by the use of the microscope system 100. The spatial frequency component when the test object 60 is imaged with the predetermined intensity distribution is stored in the storage unit 206. This result serves as a sample test object when a test object is observed in the next time.

As described above, the microscope system 100 according to this embodiment can easily find out a suitable intensity distribution of illumination light or a suitable wavelength filter using the spatial frequency component as an image feature amount when observing a test object 60.

The processes of the flowchart shown in FIG. 4 may be stored as a program on a storage medium. By installing the program stored on the storage medium on a computer, the computer can be made to perform the calculation or the like.

Second Embodiment

The microscope system 100 including a bright-field microscope has been described in the first embodiment, but a microscope system 300 including a phase-contrast microscope will be described in a second embodiment of the invention.

<Microscope System 300>

Figure 5B:
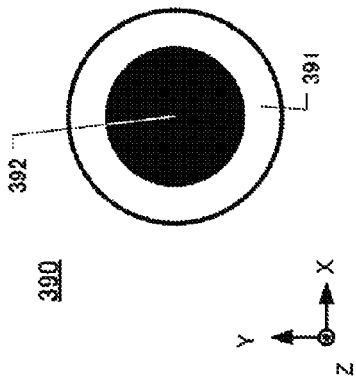
FIG. 5B is a plan view of a first spatial light modulating device in the second embodiment.
Figure 5C:
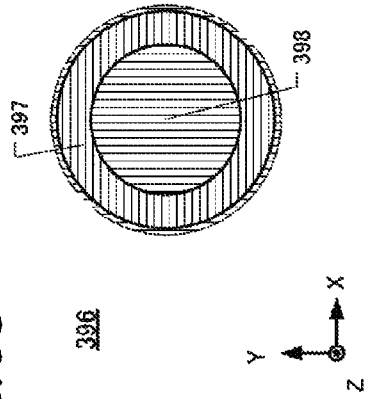
FIG. 5C is a plan view of a second spatial light modulating device in the second embodiment.
Figure 5A:
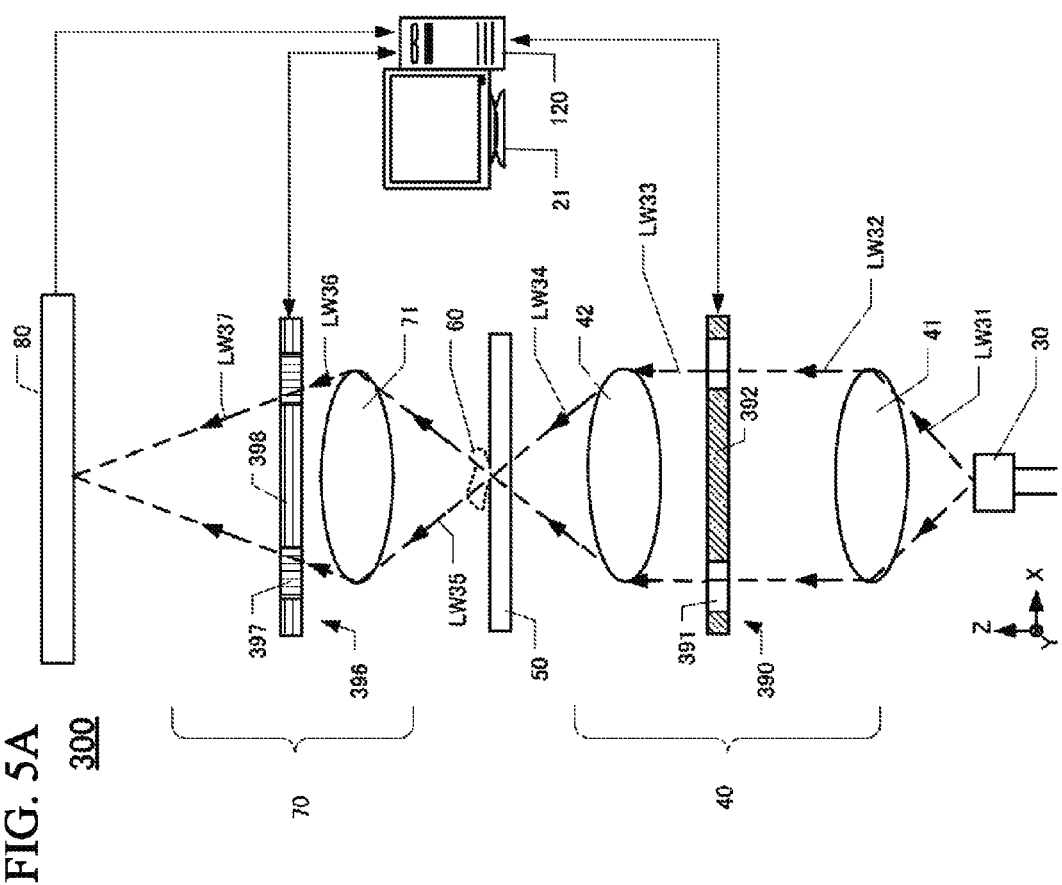
FIG. 5A is a diagram schematically illustrating the configuration of a microscope system in the second embodiment.

FIG. 5A is a diagram schematically illustrating the configuration of a microscope system 300. The microscope system 300 is an optical microscope system for observing a test object 60. The microscope system 300 includes an illumination light source 30, an illuminating optical system 40, an imaging optical system 70, an image sensor 80, and a calculation unit 120 as major elements. The illuminating optical system 40 includes a first condenser lens 41, a first spatial light modulating device 390, and a second condenser lens 42. The imaging optical system 70 includes an objective lens 71 and a second spatial light modulating device 396. A stage 50 is disposed between the illuminating optical system 40 and the imaging optical system 70 and a test object 60 is placed on the stage 50.

The second spatial light modulating device 396 is disposed at a position of a pupil of the imaging optical system 70 or in the vicinity thereof. The first spatial light modulating device 390 is disposed at a position in the illuminating optical system 40 conjugate to the pupil of the imaging optical system 70. The first spatial light modulating device 390 is a device that can arbitrarily change the intensity distribution of light passing therethrough and is constructed by a liquid crystal panel, a DMD, or the like. The second spatial light modulating device 396 is constructed by a liquid crystal panel or the like which can change the phase. The second spatial light modulating device 396 is preferably configured to freely change the intensity distribution of light along with the phase.

In FIG. 5A, light emitted from the illumination light source 30 is indicated by a dotted line. The illumination light LW31 emitted from the illumination light source 30 is converted into light LW32 by the first condenser lens 41. The light LW32 is incident on the first spatial light modulating device 390. The light LW33 passing through the first spatial light modulating device 390 is converted into light LW34 by passing through the second condenser lens 42 and is directed to the test object 60. The light LW35 passing through the test object 60 is converted into light LW36 by passing through the objective lens 71 and is incident on the second spatial light modulating device 396. The light LW36 is converted into light LW37 by passing through the second spatial light modulating device 396 and is focused on the image sensor 80. An image signal of the image formed on the image sensor 80 is sent to the calculation unit 120. The calculation unit 120 analyzes the spatial frequency component of the test object 60 on the basis of the image acquired from the image sensor 80. An illumination shape suitable for observation of the test object 60 is transmitted to the first spatial light modulating device 390 and the second spatial light modulating device 396.

FIG. 5B is a plan view of the first spatial light modulating device 390. A ring-like transmission region (illumination region) 391 is formed in the first spatial light modulating device 390 and the region other than the transmission region 391 serves as a light-shielding region 392.

FIG. 5C is a plan view of the second spatial light modulating device 396. A ring-like phase modulation region 397 is formed in the second spatial light modulating device 396 and a phase of a quarter wavelengths is added to light passing through the phase modulation region 397. Light passing through a diffracted light transmission region 398 which is an area other than the phase modulation region 397 is not changed in phase. The phase modulation region 397 is formed to be conjugate to the transmission region 391 of the first spatial light modulating device 390.

Zero-order light (transmitted light) of the microscope system 300 passes through the transmission region 391 of the first spatial light modulating device 390, passes through the phase modulation region 397 of the second spatial light modulating device 396, and reaches the image sensor 80. Diffracted light created from the test object 60 passes through the diffracted light transmission region 398 of the second spatial light modulating device 396 and reaches the image sensor 80. The zero-order light and the diffracted light form an image on the image sensor 80. In general, since the zero-order light has intensity stronger than that of the diffracted light, it is preferable to form a filter adjusting the light intensity of the phase modulation region 397.

The first spatial light modulating device 390 and the second spatial light modulating device 396 can freely change the sizes and shapes of the transmission region 391 and the phase modulation region 397. That is, the spatial distribution of phase added to the transmitted light or the spatial distribution of transmittance can be changed. As described in the first embodiment, the shape of the transmission region 391 of the first spatial light modulating device 390 can be optimized by reading an illumination shape stored in the storage unit. The ring-like region 397 of the second spatial light modulating device 396 is formed to always be conjugate to the transmission region 391 of the first spatial light modulating device 390. Accordingly, it is preferable for the transmission region 391 and the ring-like region 397 to change shapes in synchronization with each other.

<Configuration of Calculation Unit 120>

Figure 6:
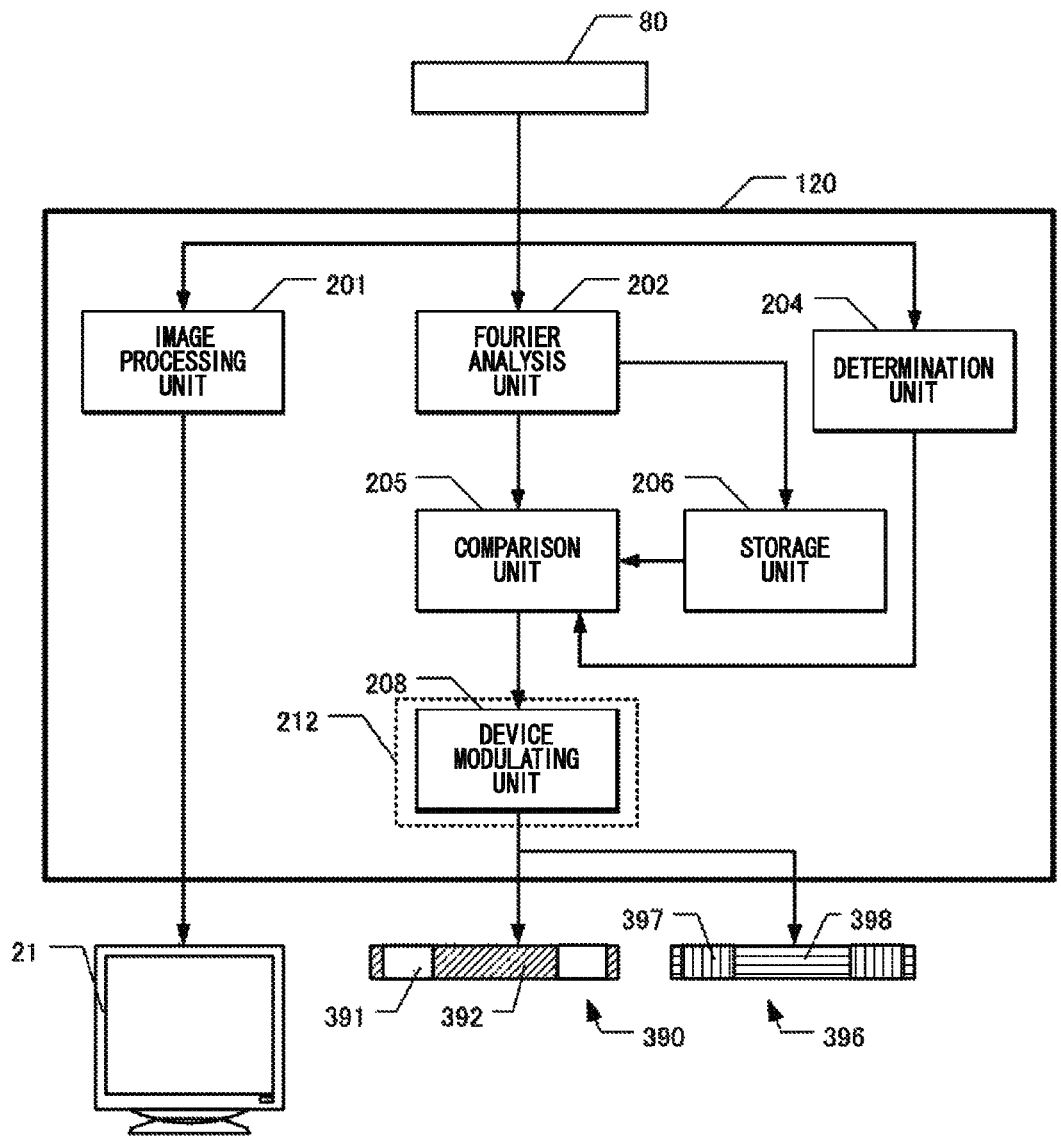
FIG. 6 is a diagram schematically illustrating the configuration of a calculation unit in the second embodiment.

FIG. 6 is a conceptual diagram illustrating the configuration of the calculation unit 120. The configuration is basically the same as the configuration of the calculation unit 20 shown in FIG. 3, but the calculation unit 120 is different from the calculation unit 20, in that it additionally includes a determination unit 204 but does not include the filter driving unit 209. Also a setting unit 212 setting illumination conditions includes only a single device modulating unit 208. Furthermore, the calculation unit 120 is different from the calculation unit 20, in that the single device modulating unit 208 is connected to the first spatial light modulating device 390 and the second spatial light modulating device 396. Hereinafter, the configuration different from the calculation unit 20 will be mainly described.

The determination unit 204 receives an image signal form the image sensor 80. The determination unit 204 determines which of a phase object and an absorbing object the test object 60 is on the basis of the contrast of the image. A phase object is a transparent and colorless object which does not change the light intensity of transmitted light and changes only the phase. An absorbing object is also called a light-absorbing object or an intensity object and is a colored object which changes the light intensity of transmitted light.

The determination unit 204 determines whether the test object is a phase object or an absorbing object on the basis of the image of the test object 60 captured under the following two conditions. Under the first condition, the image sensor 80 detects the test object 60 in the state where the transmission region 391 of the first spatial light modulating device 390 has a circular shape and does not have the light-shielding region 392 and the second spatial light modulating device 396 does not have the phase modulation region 397 and does not provide any phase difference over the entire surface. Under the second condition, the image sensor 80 detects the test object 60 in the state where the transmission region 391 of the first spatial light modulating device 390 has a ring shape and the phase modulation region 397 of the second spatial light modulating device 396 has a ring shape and provides a phase difference of a quarter wavelengths.

The determination unit 204 determines whether the image contrast of the test object 60 imaged under the first condition is higher than a threshold value and whether the image contrast of the test object 60 imaged under the second condition is higher than a threshold value. For example, when the test object 60 is a phase object, the image contrast of the test object 60 imaged under the first condition is low and the image contrast of the test object 60 imaged under the second condition is high. On the contrary, when the test object 60 is an absorbing object, the image contrast of the test object 60 imaged under the first condition is high and the image contrast of the test object 60 imaged under the second condition is low. In this way, the determination unit 204 determines which of the phase object and the absorbing object the test object 60 is. The determination result in the determination unit 204 is sent to the comparison unit 205.

The comparison unit 205 uses the result sent from the determination unit 204 to compare the spatial frequency component of the test object 60 with the spatial frequency components stored in advance in the storage unit 206.

The device modulating unit 208 changes the size or shape of the illumination region 391 of the first spatial light modulating device 390 on the basis of the suitable intensity distribution of illumination light. The device modulating unit 208 changes the size or shape of the phase modulation region 397 of the second spatial light modulating device 396 on the basis of the suitable intensity distribution of illumination light.

<Spatial Frequency Component of Test Object Stored in Storage Unit>

Figure 7:
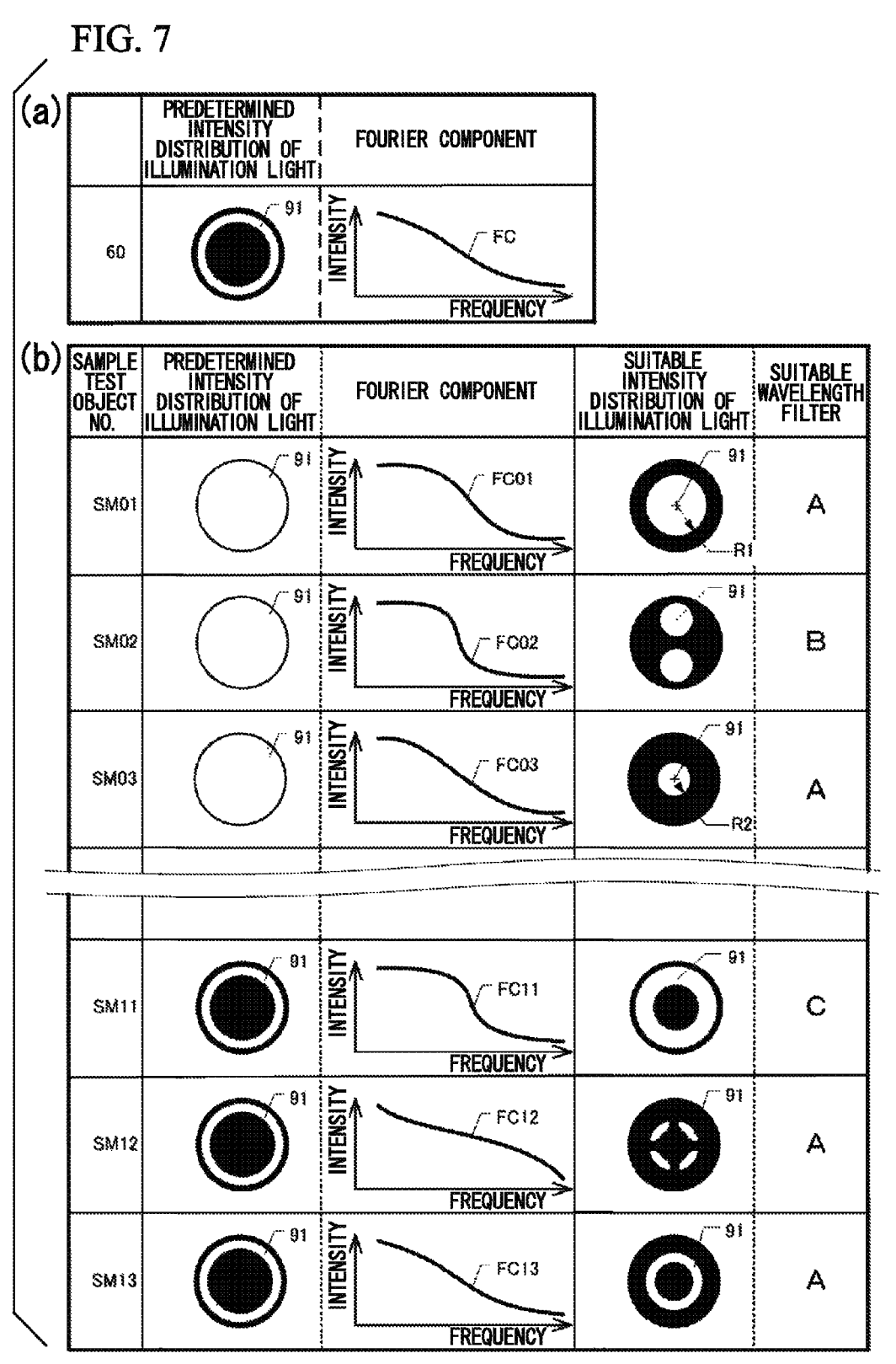

FIG. 7 is a conceptual diagram illustrating other spatial frequency components or the like stored in the storage unit 206. FIG. 7(a) shows an example of the spatial frequency component of the test object 60 obtained from the ring-like intensity distribution of illumination light. FIG. 7(b) shows an example of spatial frequency components of sample test objects SM01 to SM13.

In the second embodiment, the test object 60 is detected by the image sensor 80 under two predetermined conditions. For example, in the first condition, the predetermined intensity distribution of illumination light does not provide a phase difference of the second spatial light modulating device 396 in the distribution in which the illumination region 391 of the first spatial light modulating device 390 is fully opened. In the second condition, the illumination region 391 of the first spatial light modulating device 390 has a ring shape intensity distribution and the phase modulation region 397 of the second spatial light modulating device 396 has a ring shape intensity distribution and provides a phase difference of a quarter wavelengths.

The second condition is also stored as the predetermined intensity distribution of illumination light. As shown in FIG. 7(a), the predetermined intensity distribution is stored in correlation with the test object 60 along with the spatial frequency component FC of the test object 60. Although not shown in the drawings, a filter transmitting light of the overall visible range (400 nm to 800 nm) is used as the wavelength filter 44 when first detecting the test object 60.

The sample test objects SM (SM01 to SM13) have spatial frequency components FC (FC01 to FC13) acquired in advance through the use of experiments or the like. A phase object or an absorbing object is stored as the sample test object SM. A phase object is a transparent and colorless object which does not change the light intensity of transmitted light and changes only the phase. An absorbing object is also called a light-absorbing object or an intensity object and is a colored object which changes the light intensity of transmitted light. In FIG. 7(b), the sample test objects SM01 to SM03 are stored as the absorbing object. The sample test objects SM11 to SM13 are stored as the phase object. This is only an example, and it is preferable to have several hundreds of sample test objects as phase objects stored. The sample test objects SM01 to SM03 as the absorbing objects are the same as the sample test objects SM01 to SM03 shown in FIG. 3. Accordingly, the description thereof will not be repeated in the following.

As for the sample test objects SM11 to SM13 as the phase object, the spatial frequency components FC11 to FC13 acquired with the intensity distribution in which the illumination region 391 of the first spatial light modulating device 390 has a ring shape (orbicular shape) are stored in the storage unit 206. Although not shown in the drawing, the spatial frequency components FC11 to FC13 of the sample test objects SM11 to SM13 are detected using a filter transmitting visible rays.

As for the sample test objects SM (SM11 to SM13) as the phase object, the intensity distributions of illumination light suitable for the sample test objects SM are additionally stored. The optimal wavelength filters are also stored. For example, it is shown that an intensity distribution of illumination light having a transmission region 391 having a large ring width and a wavelength filter 44C (for example, 600 nm to 800 nm) are suitable for the sample test object SM11. It is shown that an intensity distribution of illumination light having a transmission region 391 in which a ring is divided into four parts and a wavelength filter 44A are suitable for the sample test object SM12. It is shown that an intensity distribution of illumination light having a transmission region 391 having a small ring width and a wavelength filter 44A are suitable for the sample test object SM13. The microscope system 300 does not use the information of the wavelength filter 44 even it is stored in the storage unit 206. The microscope system 300 including the wavelength filter 44 may use the information of the wavelength filter 44 stored in the storage unit 206.

<Operation of Microscope System 300>

Figure 8:
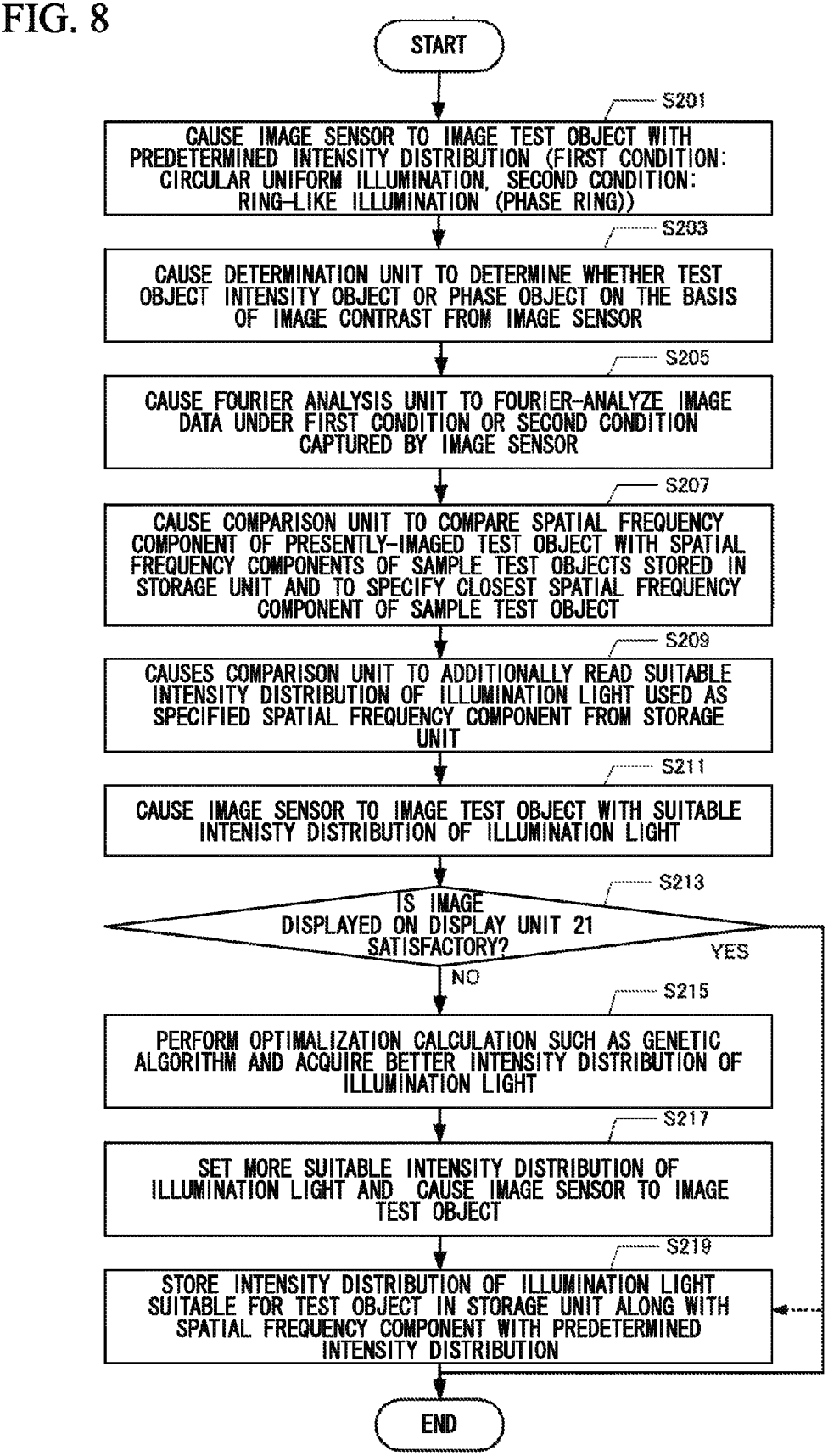
FIG. 8 is an example of a flowchart illustrating the operation flow of the microscope system in the second embodiment.

FIG. 8 is an example of a flowchart illustrating the operation flow of the microscope system 300.

In step S201, the first spatial light modulating device 390 and the second spatial light modulating device 396 are modulated into two predetermined intensity distributions (first condition: circular uniform illumination, second condition: ring-like illumination (phase ring)). The test object 60 is imaged by the image sensor 80 under the respective conditions.

In step S203, the determination unit 204 determines whether the test object 60 is an absorbing object or a phase object on the basis of the contrast of the image of the test object 60. For example, when the test object 60 is a phase object, the contrast of the image of the test object 60 captured under the first condition is low and the contrast of the image of the test object 60 captured under the second condition is high. In this flowchart, the explanation is made based on an assumption that the determination unit 204 determines that the test object 60 is a phase object.

In step S205, the Fourier analysis unit 202 analyzes a two-dimensional image of a phase object detected by the image sensor 80. The captured two-dimensional image is processed by the image processing unit 201 and is then displayed on the display unit 21.

In step S207, the comparison unit 205 compares the spatial frequency component FC of the test object 60 shown in FIG. 7(a) with the spatial frequency components FC11 to FC13 shown in FIG. 7(b). Since the determination result that the test object 60 is a phase object is received from the determination unit 204, the comparison unit 205 narrows the comparison target to the sample test objects SM11 to SM13 as a phase object and compares the spatial frequency component FC of the test object 60 with the spatial frequency components FC11 to FC13.

The comparison unit 205 specifies one of the spatial frequency components FC11 to FC13 closest to the spatial frequency component FC through the use of a curve fitting method such as a least-square method. In the example shown in FIG. 7(b), the spatial frequency component FC of the test object 60 is closest to the spatial frequency component FC13 of the sample test object SM13. Accordingly, the comparison unit 205 specifies the spatial frequency component FC13 of the sample test object SM13. When the test object 60 is, for example, a cell, it is estimated that the cell structure of the test object resembles the cell structure of the sample test object SM13. Accordingly, the predetermined intensity distribution of illumination light suitable for observation of the sample test object SM13 is specified.

In step S209, the comparison unit 205 reads the intensity distribution of illumination light that is suitable for observation of the specified sample test object SM13, which is the specified phase object, from the storage unit 206.

In step S211, the suitable intensity distribution of illumination light is sent to the device modulating unit 208. The illumination region 391 of the first spatial light modulating device 390 and the phase modulation region 397 of the second spatial light modulating device 396 are set to the suitable intensity distribution of illumination light. The test object 60 is imaged by the image sensor 80. The captured two-dimensional image is displayed on the display unit 21. When an observer intends to observe the test object 60 but does not know what intensity distribution of illumination light is suitable, the microscope system 300 can automatically select the suitable intensity distribution of illumination light. The microscope system 300 can find the intensity distribution of illumination light suitable for the test object 60 in a short time.

In step S213, the observer determines whether the two-dimensional image displayed on the display unit 21 is a satisfactory image. The image of the test object 60 is captured by the use of the suitable intensity distribution of illumination light but the observer may want to observe the test object 60 in a superior state. Furthermore, even when the spatial frequency component FC of the test object 60 is closest to the spatial frequency component FC of the sample test object SM, both are not always equal to each other and thus the two-dimensional image may not be the most suitable one. When the observer determines that the two-dimensional image displayed on the display unit 21 is a satisfactory image (YES), the observation of the test object 60 is ended. As indicated by a dotted line, the observation may be ended after the spatial frequency component when the test object 60 is imaged with a predetermined intensity distribution is stored in step S219. When the observer wants to observe a better two-dimensional image (NO), the operation flow goes to step S215.

In step S215, the intensity distribution of illumination light or the wavelength filter is optimally calculated through the use of a simulated annealing method, a Tabu search method, a hill-climbing method, a genetic algorithm, or the like. A better intensity distribution of illumination light is acquired.

In step S217, the test object 60 is imaged by the image sensor 80 through the use of the intensity distribution of illumination light acquired in step S215.

In step S219, the acquired intensity distribution of illumination light or wavelength filter is stored in the storage unit 206 as the intensity distribution of illumination light suitable for imaging the test object 60 by the use of the microscope system 300. The spatial frequency component when the test object 60 is imaged with the predetermined intensity distribution is stored in the storage unit 206. This result serves as a sample test object when a test object is observed next time.

As described above, the microscope system 300 according to this embodiment can easily find out a suitable intensity distribution of illumination light using an image feature amount including the spatial frequency component when observing a test object 60.

The processes of the flowchart shown in FIG. 8 may be stored as a program in a storage medium. By installing the program stored in the storage medium in a computer, the computer can be made to perform the calculation or the like.

<Method of Deriving Intensity Distribution of Illumination Light>

In step S113 of FIG. 4 or step S215 of FIG. 8, the intensity distribution of illumination light suitable for the test object 60 is acquired. Although there are various deriving methods, two methods of a hill-climbing method and a method using a genetic algorithm will be described below. The following flowcharts show examples where the hill-climbing method and the method using a genetic algorithm are applied to the microscope system 300 according to the second embodiment. Although not described, the methods may be applied to the microscope system 100 according to the first embodiment.

<Hill-Climbing Method>

The hill-climbing method is a method of gradually changing the initially-set illumination shape, acquiring an image signal of an image for each change of the initially-set illumination shape, and finding conditions in which the image signal is closest to the conditions set by an observer. This will be described below with reference to FIG. 9.

Figure 9:
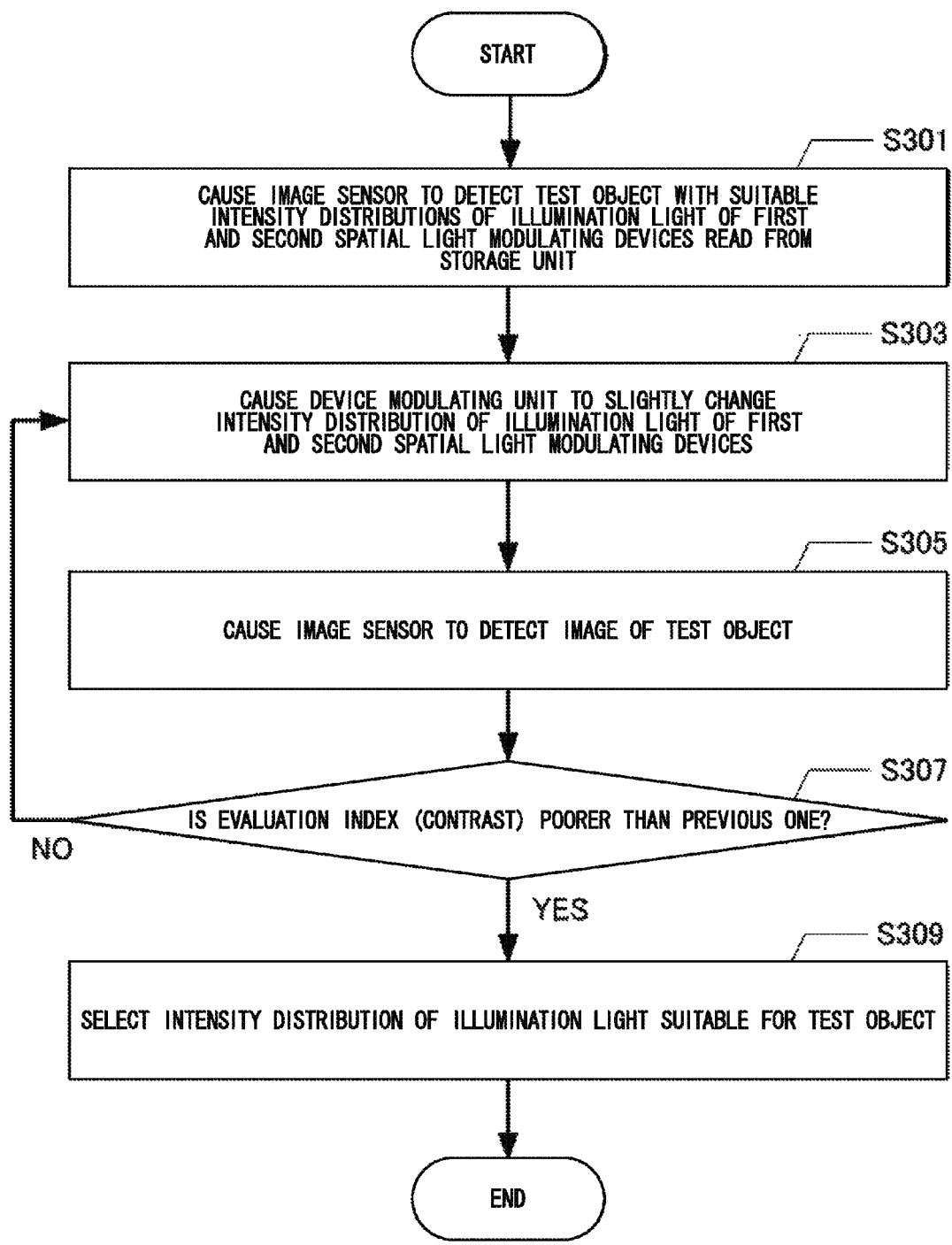
FIG. 9 is a flowchart using a hill-climbing method.

FIG. 9 is a flowchart illustrating the hill-climbing method of finding a suitable intensity distribution while gradually changing the intensity distribution of illumination light.

In step S301, first, the illumination region 391 of the first spatial light modulating device 390 and the phase modulation region 397 of the second spatial light modulating device 396 read from the storage unit 206 are set to suitable intensity distributions of illumination light. In step S301, the result of step S211 shown in FIG. 8 may be diverted.

In step S303, the device modulating unit 208 slightly changes the sizes of the illumination region 391 of the first spatial light modulating device 390 and the phase modulation region 397 of the second spatial light modulating device 396. That is, in step S303, the intensity distribution of illumination light is slightly changed.

In step S305, the image of the test object 60 is detected by the image sensor 80. Then, an image signal is sent to the calculation unit 120.

In step S307, it is determined whether an image based on the image signal sent to the calculation unit 120 is poorer than the previous image. For example, the contrast calculated on the basis of the present image signal is compared with the contrast calculated on the basis of the previously-acquired image signal. When the present contrast is not poorer than the previous contrast, the sizes or shapes of the illumination region 391 and the phase modulation region 397 are changed again in step S303 and the image signal thereof is detected (step S305). That is, since the contrast of the present image signal is higher, sizes or shapes of the illumination region 391 and the phase modulation region 397 are changed again in step S303. On the other hand, when the present contrast is poorer than the previous contrast, the previous sizes or shapes of the illumination region 391 and the phase modulation region 397 are the highest. Accordingly, the operation flow goes to step S309.

In step S309, an illumination shape suitable for observation of the test object 60 is selected. That is, the illumination region 391 and the phase modulation region 397, which were used just before the contrast of the observation region 24 became poorer, are set as the intensity distribution of illumination light suitable for observation of the test object 60 and are used for observation of the test object 60. As described in step S219 of FIG. 8, the acquired illumination region 391 and the phase modulation region 397 are stored in the storage unit 206.

<Method Using Genetic Algorithm>

The method using a genetic algorithm will be described below. The method using a genetic algorithm is a method of finding an intensity distribution of illumination light by acquiring image signals for plural prepared intensity distributions of illumination light and combining the intensity distributions suitable for observation of the test object 60 among them.

Figure 10:
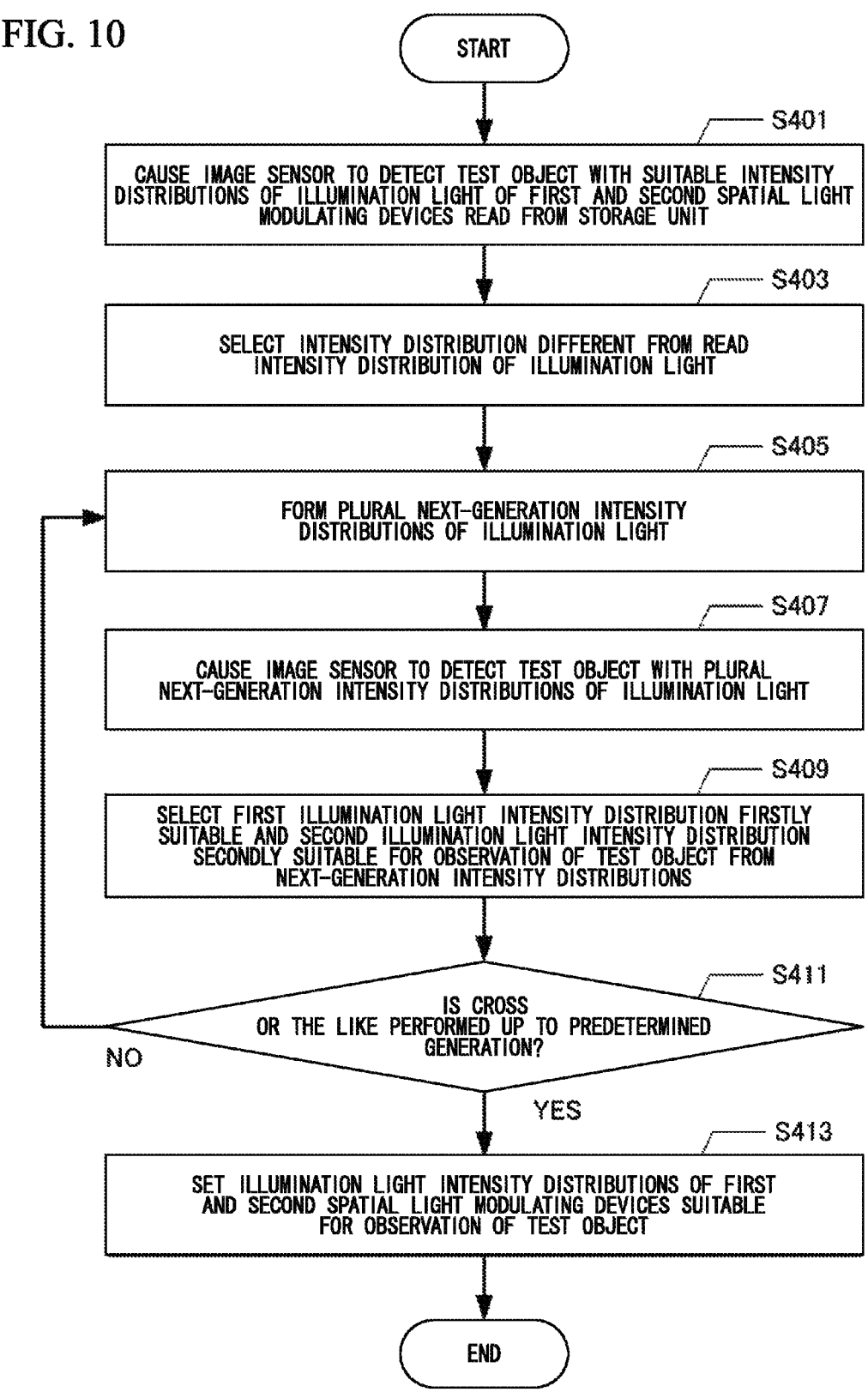
FIG. 10 is a flowchart using a genetic algorithm.

FIG. 10 is a flowchart using the genetic algorithm.

First, in step S401, the illumination region 391 of the first spatial light modulating device 390 and the phase modulation region 397 of the second spatial light modulating device 396 read from the storage unit 206 are set to suitable intensity distributions of illumination light.

In step S403, the image of the test object 60 is detected by the image sensor 80 using the read intensity distributions of the illumination region 391 and the phase modulation region 397 and other plural intensity distributions. The result of step S211 of FIG. 8 may be diverted as the image of the read intensity distributions of the illumination region 391 and the phase modulation region 397.

In step S405, plural next-generation intensity distributions of illumination light are formed through the use of a cross or mutation technique of the genetic algorithm.

In step S407, the image of the test object 60 is detected by the image sensor 80 using the plural next-generation intensity distributions of illumination light.

In step S409, the contrasts of the images of the test object 60 acquired in step S407 or the like are compared and a first illumination light intensity distribution which is the most suitable intensity distribution of illumination light and a second illumination light intensity distribution which is a second most suitable intensity distribution of illumination light among these.

In step S411, it is determined whether the cross or mutation is made up to a predetermined generation, for example, the 1000-th generation. When the cross and the like is not made up to the predetermined generation, the intensity distribution of illumination light suitable for observation of the test object is further found again in step S405. When the cross and the like are made up to the predetermined generation, the operation flow goes to step S413.

In step S413, the illumination shape of the generation closest to the observer's desired conditions is selected from the illumination region 391 acquired through the cross and the like up to the predetermined generation, for example, the 1000-th generation. The illumination region 391 of the first spatial light modulating device 390 and the phase modulation region 397 of the second spatial light modulating device 396 having the intensity shape of illumination light of the generation are used for observation of the test object 60. As described in step S219 of FIG. 8, the acquired illumination region 391 and phase modulation region 397 are stored in the storage unit 206.

<Centralized Management of Spatial Frequency Component>

Figure 11:
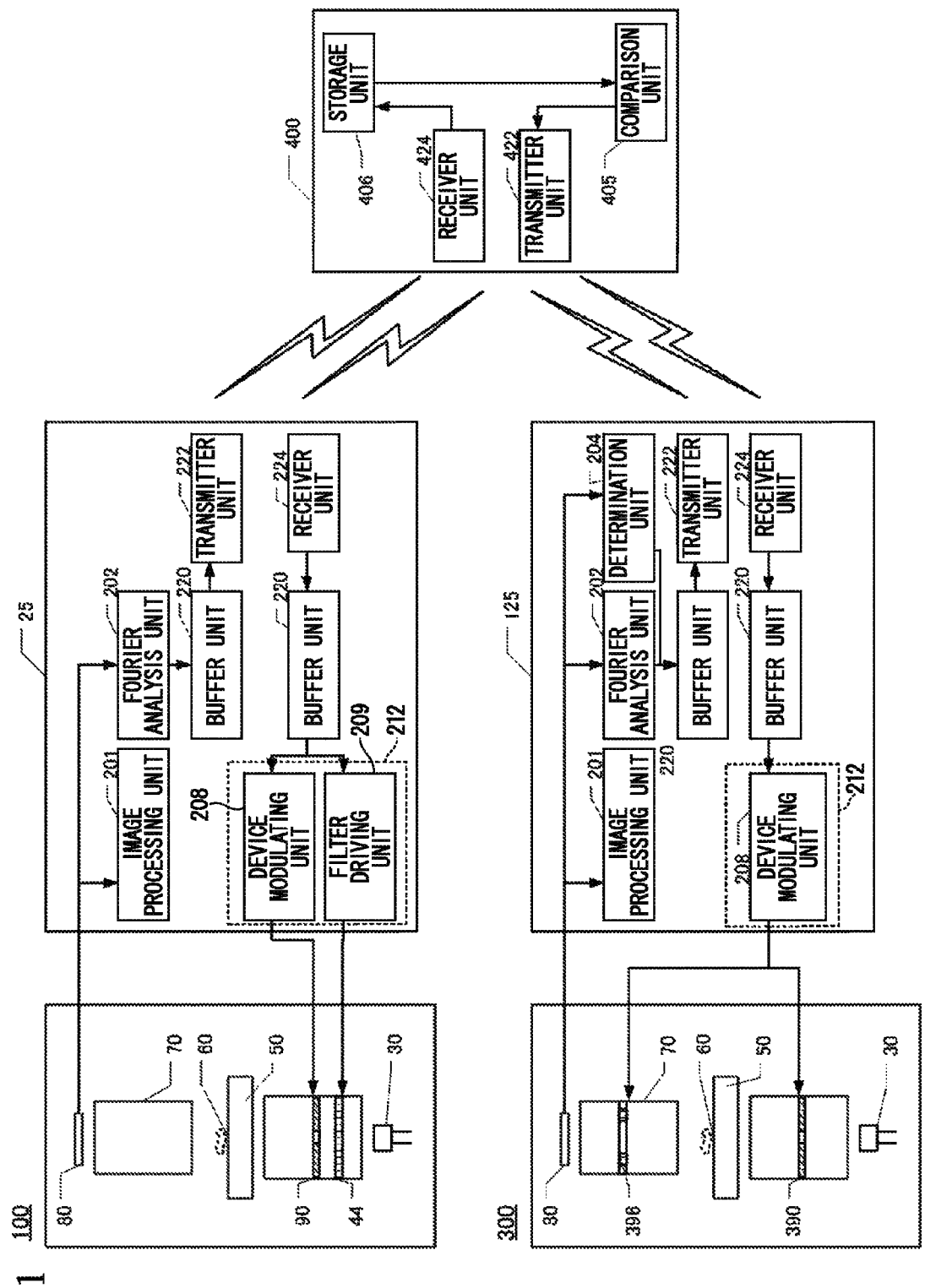
FIG. 11 is a diagram schematically illustrating the centralized management of a spatial frequency component using a server.

FIG. 11 is a diagram schematically illustrating the configuration of centralized management of a spatial frequency component using a server 400.

The microscope system 100 includes a calculation unit 25. Unlike the calculation unit 20 (FIG. 2), the calculation unit 25 does not include the comparison unit 205 and does not include the storage unit 206 storing the spatial frequency components of the sample test objects SM. On the other hand, the calculation unit 25 includes a buffer unit 220 temporarily storing data, a transmitter unit 222 transmitting information such as the spatial frequency components FC to the outside, and a receiver unit 224 receiving information of suitable intensity distributions of illumination light or the like from the outside as a communication function of the Internet or the like.

The microscope system 300 includes a calculation unit 125. Unlike the calculation unit 120 (FIG. 6), the calculation unit 125 does not include the comparison unit 205 and does not include the storage unit 206 storing the spatial frequency components of the sample test objects SM. On the other hand, the calculation unit 125 includes a buffer unit 220, a transmitter unit 222, and a receiver unit 224.

The server 400 includes a comparison unit 405 comparing the spatial frequency component FC of the test object 60 with the spatial frequency components of the sample test objects and a storage unit 406 storing the spatial frequency components FC of the sample test objects SM. The server 400 includes a transmitter unit 422 transmitting information of a suitable intensity distribution of illumination light or the like to the outside and a receiver unit 424 receiving information of the spatial frequency components FC or the like from the outside.

The microscope system 100 and the microscope system 300 are drawn singly, but plural microscope systems are disposed actually. On the other hand, the number of serves 400 is one or small. The microscope system 100 and the microscope system 300 image a test object 60 with predetermined intensity distributions of illumination light. The image signal of the test object 60 is analyzed by the Fourier analysis unit 202 of each of the microscope system 100 and the microscopes system 300. The transmitter 222 thereof transmits the spatial frequency component FC of the test object 60 to the server 400. However, it is not necessarily for the systems to transmit the image signal of the test object 60. The receiver unit 424 of the server 400 receives the spatial frequency component FC of the test object.

The comparison unit 405 of the server 400 compares the transmitted spatial frequency component FC of the test object 60 with the spatial frequency components FC of the sample test objects SM stored in the storage unit 406. The spatial frequency component of the closest sample test object is specified. The comparison unit 405 specifies a predetermined intensity distribution of illumination light or a wavelength filter suitable for observation of the sample test object. The comparison unit 405 reads the specified intensity distribution of illumination light or wavelength filter suitable for observation of the sample test object from the storage unit 406. The read intensity distribution of illumination light or wavelength filter is transmitted to the microscope system 100 and the microscope system 300 via the transmitter unit 422.

The receiver units 224 of the microscope system 100 and the microscope system 300 receive the intensity distribution of illumination light or wavelength filter suitable for observation and the setting units 212 set the illumination conditions on the basis of the received result. The device modulating units 208 modulate the first spatial light modulating devices 90 and 390 to the suitable intensity distribution of illumination light. The filter driving unit 209 changes the transmission wavelength of the wavelength filter 44. The microscope system 100 and the microscope system 300 can easily select the suitable intensity distribution of illumination light by using the image feature amount including the spatial frequency component when observing the test object 60.

An observer observes the two-dimensional image of the test object 60 detected by the image sensor 80 with the suitable intensity distribution of illumination light, and if the observer satisfies with the two-dimensional image, the observation of the test object 60 ends. When it is intended to observe a better two-dimensional image, the microscope system 100 and the microscope system 300 optimally calculate the intensity distribution of illumination light or the wavelength filter through the use of the hill-climbing method, the genetic algorithm, or the like.

The optimal calculation results of the microscope system 100 and the microscope system 300 are sent to the server 400 via the transmitter unit 222 and are stored as sample test objects in the storage unit 406 of the server 400 along with the spatial frequency components. Since the storage unit of the server 400 stores the intensity distribution of illumination light or the like sent from the plural microscope systems 100 and microscope systems 300, very large number of spatial frequency components are stored. Therefore, the comparison unit 405 of the server 400 can specify the closest spatial frequency component.

By using the above-mentioned methods, the information of a test object 60 can be detected and the calculation unit 20 can automatically set the illumination shape suitable for observation of a test object, but various modifications may be made to the embodiments.

For example, in the microscope system 100, the illumination light source 30 emits white illumination light and only a specific wavelength range of a light beam is transmitted by the wavelength filter 44. Instead of using the wavelength filter 44, an illumination light source 30 including plural LEDs emitting different wavelengths of light beams (for example, red, green, and blue) may be used. For example, when it is intended to irradiate a test object 60 with white light, the red, green, and blue LEDs are simultaneously turned on. When it is intended to irradiate the test object 60 with red light, only the red LED is turned on. In this way, the wavelength of illumination light may be selected.

For example, the microscope system 300 shown in FIG. 5 may further include a wavelength filter. In the first and second embodiments, the spatial frequency component has been used as an image feature amount, but the image feature amount is not limited to the spatial frequency component. For example, a histogram (with a vertical axis representing an appearance frequency and a horizontal axis representing a gray scale value) representing appearance frequencies of gray scales may be also used as the image feature amount. A maximum inclination may be used as the image feature amount. The maximum inclination represents the maximum variation in brightness value of a spatial brightness profile (with a horizontal axis representing, for example, a position in the X direction and a vertical axis representing a brightness value). A contrast may be used as the image feature amount.

What is claimed is:

1. A microscope system comprising:
an optical microscope for observing a test object; and
a computer connected to the microscope;
wherein the microscope comprises,
an illuminating optical system that illuminates the test object with illumination light from a light source under predetermined illumination conditions,
an imaging optical system that forms an image of the test object on the basis of light from the test object, and
an image sensor that detects the image of the test object formed by the imaging optical system and outputs an image signal, and
wherein the computer comprises,
an image analyzing unit that acquires an image feature amount of the test object on the basis of the image signal detected by the image sensor,
a storage unit that has stored therein image feature amounts corresponding, respectively, to each of a plurality of sample test objects, which were obtained by illuminating the plurality of sample test objects with the illumination light under the predetermined illumination conditions, correlated with illumination states of illumination light suitable for observation of each of the sample test objects, respectively,
a comparison unit that compares the image feature amount of the test object with the image feature amounts corresponding to each of the plurality of sample test objects, respectively, and thereby determines and specifies an image feature amount of a sample test object closest to the image feature amount of the test object, and
a setting unit that automatically sets illumination conditions of the illuminating optical system to an illumination condition suitable for observation of the test object on the basis of the illumination state of the illumination light that is suitable for observation of the sample test object having the image feature amount specified by the comparison unit,
wherein the illuminating optical system further comprises a first spatial light modulating device that changes an intensity distribution of the illumination light at a position conjugate to a pupil of the imaging optical system,
wherein the setting unit comprises a device modulating unit that modulates the first spatial light modulating device, and
wherein the setting unit sets an illumination region of the first spatial light modulating device fully open under the predetermined illumination conditions.

2. The microscope system according to claim 1, wherein the image feature amount of the test object comprises a spatial frequency component, a histogram, a contrast, or a maximum inclination of at least a part of the image of the test object.

3. The microscope system according to claim 1, wherein the computer slightly changes the intensity distribution of the illumination light using the image signal of the test object, which was detected by the image sensor, as initial data under the intensity distribution of the illumination light by the first spatial light modulating device, which was modulated by the device modulating unit, acquires the image signal whenever the intensity distribution of the illumination light is changed, and sequentially calculates a suitable intensity distribution of the illumination light.

4. The microscope system according to claim 1, wherein the computer changes the intensity distribution of the illumination light from the initial data to form first and second illumination light intensity distributions, acquires first and second image signals corresponding to the first and second illumination light intensity distributions, and calculates an optimal illumination light intensity distribution through use of a genetic algorithm.

5. The microscope system according to claim 1, further comprising a second spatial light modulating device that is disposed in a position conjugate to a pupil or a vicinity of the position of the pupil of the imaging optical system and at a position conjugate to the first spatial light modulating device,
wherein the second spatial light modulating device changes a spatial distribution of a phase added to transmitted light or a spatial distribution of transmittance.

6. The microscope system according to claim 1, further comprising a determination unit that determines whether the test object is an absorbing object or a phase object on the basis of the image signal detected by the image sensor.

7. The microscope system according to claim 1, wherein the microscope further comprises a wavelength filter that selects a wavelength range of the illumination light, and wherein the image signal detected by the image sensor is detected through the use of the wavelength filter.

8. The microscope system according to claim 1, wherein each of the sample test objects comprises a test object previously observed by the microscope system.

9. On a non-transitory computer-readable storage medium, a program for observing a test object using a microscope system including a microscope comprising an illuminating optical system that illuminates the test object with illumination light from a light source under predetermined illumination conditions, an imaging optical system that forms an image of the test object on the basis of light from the test object, and an image sensor that detects the image of the test object formed by the imaging optical system and outputs an image signal and a computer connected to the microscope, and wherein the computer comprises:
- a storage unit that has stored therein image feature amounts corresponding, respectively, to each of a plurality of sample test objects, which were obtained by illuminating the plurality of sample test objects with the illumination light under the predetermined illumination conditions, correlated with illumination states of illumination light suitable for observation of each of the sample test objects, respectively,
- a comparison unit that compares the image feature amount of the test object with the image feature amounts corresponding to each of the plurality of sample test objects, respectively, and thereby determines and specifies an image feature amount of a sample test object closest to the image feature amount of the test object, and
- a setting unit that automatically sets illumination conditions of the illuminating optical system to an illumination condition suitable for observation of the test object on the basis of the illumination state of the illumination light that is suitable for observation of the sample test object having the image feature amount specified by the comparison unit,
- wherein the illuminating optical system further comprises a first spatial light modulating device that changes an intensity distribution of the illumination light at a position conjugate to a pupil of the imaging optical system,
- wherein the setting unit comprises a device modulating unit that modulates the first spatial light modulating device,
- wherein the setting unit sets an illumination region of the first spatial light modulating device fully open under the predetermined illumination conditions, the program causing the computer to perform:
- image analysis of acquiring an image feature amount of the test object on the basis of the image signal detected by the image sensor,
- comparison of comparing the image feature amount of the test object with image feature amounts of each of the plurality of sample test objects,
- specification of specifying, as a result of the comparing, the image feature amount of the sample test object closest to the image feature amount of the test object, and
- automatically setting of setting illumination conditions of the illuminating optical system on the basis of an illumination state suitable for observation of the sample test object having the image feature amount specified by the comparison.

10. A microscope system comprising:
at least two optical microscopes for observing test objects, and a server separate from the optical microscopes;
wherein each microscope comprises:
- an illuminating optical system that illuminates a test object with illumination light from a light source under predetermined illumination conditions,
- an imaging optical system that forms an image of the test object on the basis of light from the test object,
- an image sensor that detects the image of the test object formed by the imaging optical system and outputs an image signal, and
- a calculation unit;

wherein each calculation unit comprises:
- an image processing unit that acquires an image feature amount of a test object on the basis of the image signal detected by the image sensor,
- an analysis unit that analyzes the image signal detected by the image sensor,
- a transmitter unit that transmits signals to the server on the basis of the analysis of the detected image signal by the analysis unit, and a receiver unit that receives signals from the server;

wherein the server comprises:
- a receiver unit that receives signals from the transmitter units,
- a storage unit that has stored therein image feature amounts corresponding, respectively, to each of a plurality of sample test objects, which were obtained by illuminating the plurality of sample test objects with the illumination light under the predetermined illumination conditions, correlated with illumination states of illumination light suitable for observation of each of the sample test objects, respectively,
- a comparison unit that compares an image feature amount of a test object with the image feature amounts corresponding to each of the plurality of sample test objects, respectively, and thereby determines and specifies an image feature amount of the sample test object closest to the image feature amount of the test object, and outputs a signal to the transmitter unit of the server designating the specified image feature amount, wherein the transmitter unit of the server outputs signals to the receiver units of the microscopes,
wherein the illuminating optical system of each microscope includes a spatial light modulating device that changes intensity distribution of the illumination light at a position conjugate to a pupil of the imaging optical system,
and
wherein each microscope has a setting unit that comprises a device modulating unit that modulates the spatial light modulating device, that sets an illumination region of the spatial light modulating device fully open under the predetermined illumination conditions, and that automatically sets illumination conditions of the illuminating optical system to an illumination condition suitable for observation of the test object on the basis of the illumination state of the illumination light that is suitable for observation of the sample test object having the image feature amount specified by the comparison unit of the server.

11. The microscope system according to claim 1, wherein the image feature amount of the test object and the image feature amounts of the plurality of sample test objects are Fourier components.

12. The microscope system according to claim 1,
wherein the image feature amount of the test object is a cell structure of the sample test object, and
wherein the image feature amount of the sample test object is a cell structure of the sample test object.

* * * * *